(12) United States Patent
Trojer

(10) Patent No.: US 9,351,187 B2
(45) Date of Patent: May 24, 2016

(54) REVERSE POWER METERING

(75) Inventor: Elmar Trojer, Täby (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 92 days.

(21) Appl. No.: 14/344,577

(22) PCT Filed: Sep. 22, 2011

(86) PCT No.: PCT/SE2011/051136
§ 371 (c)(1),
(2), (4) Date: Mar. 12, 2014

(87) PCT Pub. No.: WO2013/043091
PCT Pub. Date: Mar. 28, 2013

(65) Prior Publication Data
US 2015/0009842 A1    Jan. 8, 2015

(51) Int. Cl.
*H04J 1/16*    (2006.01)
*H04W 24/08*   (2009.01)
(Continued)

(52) U.S. Cl.
CPC .............. *H04W 24/08* (2013.01); *G06F 1/266* (2013.01); *G06F 1/3209* (2013.01);
(Continued)

(58) Field of Classification Search
CPC ....... H04W 24/08; H04W 52/04; H04L 12/10
USPC ...................................................... 370/252
See application file for complete search history.

(56) References Cited

U.S. PATENT DOCUMENTS 7,404,091 B1    7/2008  Gere
2004/0147276 A1*  7/2004  Gholmieh ........... H04W 52/365
                                              455/522

(Continued)

FOREIGN PATENT DOCUMENTS

EP    1936861    6/2008
EP    2 120 443 A1    11/2009

(Continued)

OTHER PUBLICATIONS

International Search Report, Application No. PCT/SE2011/051136, Jun. 14, 2012, 4 pages.

(Continued)

*Primary Examiner* — Sai-Ming Chan
(74) *Attorney, Agent, or Firm* — Nicholson De Vos Webster & Elliott LLP

(57) ABSTRACT

The present invention relates to a method and apparatus for determining power provided by network terminals (103) to a common network node (101). The method comprises the steps of measuring (S201) power received per time unit from each individual network terminal, determining (S202) channel power loss per time unit of each individual network terminal and determining (S203) power provided per time unit by each individual network terminal by adding, to the power received per time unit from said each individual network terminal, the corresponding channel power loss per time unit. Further, the method comprises the steps of measuring (S204) power consumption per time unit of the network node caused by each individual network terminal and determining (S205) net power per time unit provided by each individual network terminal by taking into account the network node power consumption per time unit caused by said each individual network terminal and the power provided per time unit by said each individual network terminal.

28 Claims, 8 Drawing Sheets

(51) Int. Cl.
  *H04L 12/10*  (2006.01)
  *G06F 1/26*  (2006.01)
  *G06F 1/32*  (2006.01)
  *H04W 52/04*  (2009.01)
  *H04M 19/08*  (2006.01)

(52) U.S. Cl.
  CPC ............. *G06F 1/3287* (2013.01); *H04L 12/10* (2013.01); *H04M 19/08* (2013.01); *H04W 52/04* (2013.01); *Y02B 60/1282* (2013.01)

(56) References Cited

U.S. PATENT DOCUMENTS

| | | | |
|---|---|---|---|
| 2004/0266492 A1* | 12/2004 | Lehr ..................... | G05F 1/66 455/572 |
| 2005/0207375 A1* | 9/2005 | Schiff ................ | H04B 7/18534 370/331 |
| 2010/0150556 A1 | 6/2010 | Soto et al. | |
| 2011/0154070 A1 | 6/2011 | Welter | |

FOREIGN PATENT DOCUMENTS

| | | |
|---|---|---|
| GB | 2448971 | 11/2008 |
| WO | WO-2010147596 | 12/2010 |

OTHER PUBLICATIONS

Written Opinion of the International Searching Authority, Application No. PCT/SE2011/051136, Jun. 13, 2012, 6 pages.

"Access, Terminals, Transmission and Multiplexing (ATTM); Reverse Power Feed for Remote Nodes", ETSI TR 102 629 V2.1.2 (Mar. 2011), 24 pages.

"G.vdsl, G.hn: BT's FTTdp Vision", International Telecommunication Union, Telecommunication Standardization Sector, Feb. 2011, 7 pages.

"Power Over Fiber", RLH Industries, Inc., Aug. 12, 2011, 2 pages.

European Search Report for Application No. PCT/SE2011/051136, mailed Feb. 25, 2015, 11 pages.

* cited by examiner

REVERSE POWER METERING

CROSS-REFERENCE TO RELATED APPLICATIONS

This application is a National stage of International Application No. PCT/SE2011/051136, filed Sep. 22, 2011, which are hereby incorporated by reference.

TECHNICAL FIELD

The present invention relates to a method and an apparatus for determining power provided by network terminals connected to a common network node.

BACKGROUND

Telecom equipment requires power to operate, and in the field where possibilities of providing local power supply are scarce, telecom copper cable can be utilized to transport a large amount of power from a remote supply whereas power transport capabilities of optical fibre are very limited. With the advent of deep fibre broadband access networks and small-cell mobile networks requiring broadband backhaul, i.e. architectures for providing fibre deeper in the access network and eventually all the way home to the subscribers or base-station location, some network architectures require data and telecommunication nodes to move from a central office into the field to achieve an increase in bandwidth over the user/backhaul drop. Such field nodes are typically fed by fibre without capability to transport power.

Typical architectures are fibre-to-the-cabinet networks, i.e. fibre is drawn to a street cabinet that is located within about 300 m from the user's premises where the transport media from the cabinet to the user is copper cable, and small-cell site nodes such as e.g. macro, micro and pico cells. These new architecture require new approaches to power the field nodes as direct access to the power grid is not available in remote locations or the remote power transfer from the operator's point of presence is very costly and energy-inefficient.

In the days of POTS, the telecom node was located at a central office and the associated telecom equipment provided power to a network terminal at a customer premises via twisted-pair copper cable and no local power supply was needed at the customer. Today, at least over shorter distances—IEEE 802.3af ("Power over Ethernet") and IEEE 802.3at ("Power over Ethernet+") allow to transport several tens of Watts over CAT cables in addition to data transport. In both scenarios, operators provide and pay the power. However, power loss in the copper cable is major.

In typical xDSL and fiber-to-the-home deployments, the equipment of the telecom node is powered at the central office and the network terminals at the user.

Now, in case the network node is moved from the central office to a field location, which is done in fiber-to-the-cabinet deployments as well as next-generation radio networks, the network node being for example and passive optical network (PON)-fed IPDSLAM (IP DSL Access Multiplexer) or a radio base station, the network node is powered either directly from the central office (which is ineffective) or by a remote power unit located in the field utilizing existing (long-reach) copper infrastructure once used for lower-rate xDSL technologies. As in the case of centralized powering, responsibilities for providing/maintaining power are clear—the operator answers for the central office and network node equipment while the user pays for the powering of the network terminal. Remote power feeding architectures have proven to be technically complex/expensive, energy-inefficient, and strictly regulated in terms of safety. For instance, power may have to be transported over long distances thus requiring high voltages at up to 380V@300 mA.

A further approach for field-located network nodes is reverse powering; the equipment of the field telecom node is powered reversely from the local mains of individual customer homes utilizing existing copper used for data transmission from the field node to the customer premises equipment. Hence, the filed node is powered by the users that it is servicing and the power loss is relatively low as the distance from the filed node to the user premises typically is short. With this approach, several users typically power the network node. Reverse power feeding is technically less complex than remote powering, but has been critically perceived by network operators due to legal issues and contractual problems—net contribution of each individual user to the total amount of power provided to the telecom node for servicing the users is not clear.

SUMMARY

An object of the present invention is to solve or mitigate at least some of these problems in the art.

This object is achieved in a first aspect of the present invention by a method of determining power provided by network terminals to a common network node. The method comprises the steps of measuring power received per time unit from each individual network terminal, determining channel power loss per time unit of each individual network terminal and determining power provided per time unit by each individual network terminal by adding, to the power received per time unit from said each individual network terminal, the corresponding channel power loss per time unit. Further, the method comprises the steps of measuring power consumption per time unit of the network node caused by each individual network terminal and determining net power per time unit provided by each individual network terminal by taking into account the network node power consumption per time unit caused by said each individual network terminal and the power provided per time unit by said each individual network terminal.

This object is achieved in a second aspect of the present invention by an apparatus for determining power provided by network terminals to a common network node. The apparatus comprises a power meter and a processing device. The power meter is arranged to measure power received per time unit from each individual network terminal. The processing device is arranged to measure power consumption per time unit of the network node caused by each individual network terminal and to determine channel power loss per time unit of each individual network terminal, power provided per time unit by each individual network terminal by adding, to the power received per time unit from said each individual network terminal, the corresponding channel power loss per time unit, and net power per time unit provided by each individual network terminal by taking into account the network node power consumption per time unit caused by the network terminal and the power provided per time unit by the network terminal.

This object is achieved in a third aspect of the present invention by a method of determining power provided by network terminals to a common network node. The method comprises the steps of measuring power provided per time unit by each individual network terminal and power consumption per time unit of the network node caused by each individual network terminal. Further, the method comprises the step of determining net power per time unit provided by each individual network terminal by taking into account the network node power consumption per time unit caused by the individual network terminal and the power provided per time unit by the individual network terminal.

This object is achieved in a fourth aspect of the present invention by a system for determining power provided by network terminals to a common network node. The system comprises a power meter arranged at each individual network terminal for measuring power provided per time unit by the individual network terminal. Further, the system comprises a processor arranged at the common network node for measuring power consumption per time unit of the network node caused by each individual network terminal and for determining net power per time unit provided by each individual network terminal by taking into account the network node power consumption per time unit caused by the individual network terminal and the power provided per time unit by the individual network terminal.

This object is achieved in a fifth aspect of the present invention by a method of measuring power provided by a network terminal connected to a network node comprising the steps of measuring power provided per time unit by the network terminal and communicating the measured power per time unit.

This object is achieved in a sixth aspect of the present invention by an apparatus at a network terminal for measuring power provided by the network terminal to a network node. The apparatus comprises a power meter arranged to measure power provided per time unit by the network terminal and a communication interface arranged to communicate the measured power per time unit.

Thus, by having the network node measure power received per time unit from each individual network terminal and determine channel power loss per time unit of each individual network terminal, it is also possible to determine power provided per time unit by each individual network terminal by adding, to the power received per time unit from said each individual network terminal, the corresponding channel power loss per time unit. The channel loss can typically be estimated by the network node with good accuracy, since the network node operator knows electrical length of the channel between the network node and the network terminal, as well as transport media of the channel, be it a mobile or a wire line channel. It is envisaged that the power per time unit provided by the network terminals to the network node will vary greatly among the different network terminals depending on factors such as type of channel, distance to the network node, etc. It is thus highly advantageous to determine the actual power provided by each individual network terminal per time unit.

Further, the network node measures its power consumption per time unit caused by each individual network terminal and determines net power per time unit provided by each individual network terminal by taking into account the network node power consumption per time unit caused by a current individual network terminal and the power provided per time unit by the same individual network terminal. Thus, by subtracting network node power consumption per time unit caused by a network terminal from the power provided per time unit by that network terminal (or vice versa), net power per time unit provided by the network terminal to the network node is determined. As a consequence, the operator can decide whether a user should be billed or refunded depending on whether her net contribution is positive or negative. In analogy with the above, it is envisaged that the contribution of the network terminals to the consumed power per time unit of the network node will vary greatly among the different network terminals depending on factors such as type of channel, distance to the network node, type of service requested, etc.

The reason that a user actually can be refunded is that no-load power consumption of the common network node typically is not negligible. In a network node, such as e.g. DSLAM, power consumption may be rather substantial even though connected network terminals are not being serviced by the network node at the moment. There are a number of components in the common network node that have to be powered even though the network node temporarily is not servicing a network terminal, such as the CPU, memories, transceiver circuitry for interfacing with network terminals, the common uplink to the central office equipment such as ONU (optical network unit) or point-to-point Ethernet/OTN links, etc. Consequently, at least one network terminal should be connected to and power the network node, even though the network terminal is not currently being serviced. Further, chipsets in the network node may provide multi-line support even though only one or a few network terminals are being serviced by that chipset in the network node. Thus, the network terminals being connected and possibly also serviced by the network node must together provide the node with power per time unit which at least amounts to the minimum power per time unit required by the network node to be operable, i.e. a power value equal to the above discussed no-load power consumption. In addition, the network node power consumption per time unit caused by each individual network terminal must be provided. Under these circumstances, a network terminal of a user may very well provide the network node with a positive net power per time unit, and thus should effectively be paid by the operator, since it is unreasonable that the no-load power consumption is accounted on an individual user of a network terminal.

In an embodiment of the present invention, all or some of the measured and/or determined power parameters are communicated to the centralized facility of an operator of the common network node either via wire or wireless, where the net contribution of each individual network terminal is determined.

In another embodiment of the present invention, the common network node is provided with a battery which is arranged to accumulate power provided by one or more of the network terminals connected to the common network node. Advantageously, the battery can be charged by the network terminals when they are being serviced by the network node such that components of the common network node can remain powered even though a low number of network terminals are connected. The network node is capable of controlling the charging of the battery, i.e. adjust the amount of power per time unit from each network terminal.

In yet another embodiment of the present invention, the network node is arranged to be set in a power-down mode when no network terminals are connected. Advantageously, a minimum of power is consumed by the common network node when in in power-down mode.

As an alternative to having the network node handling the measurement of power received per time unit from each individual network terminal and determining the channel power loss per time unit of each individual network terminal, each network terminal itself measures its power provided per time unit to the common network node. Then, the network node measures the power consumption per time unit of the network node caused by each individual network terminal and determines net power per time unit provided by each individual network terminal by taking into account the network node power consumption per time unit caused by a concerned individual network terminal and the power provided per time unit by that individual network terminal. Advantageously, in this alternative aspect of the present invention, there is no need to determine and take into account the channel power loss of the each individual network terminal, as each network terminal measures the actual power per time unit provided at the network terminal.

In embodiments of the alternative aspect of the present invention, the measured power provided per time unit by each individual network terminal is communicated via wire or wireless to the common network or, as already has been discussed hereinabove, to a centralized facility of an operator of the common network node, which determines the net contribution of each individual network terminal.

It is noted that power per time unit is taken into account since energy consumption is an important parameter. For instance, it is possible that the power received from a first individual network terminal is momentarily high but only provided for a short time period, whereas a second individual network terminal provides the network node with a smaller amount of power but during a long time period. Thus, by taking power per time unit into account, it is possible that the second individual network terminal over time provides the network node with more energy than the first individual node does, even though power provided by the first network terminal is momentarily higher.

Further features of, and advantages with, the present invention will become apparent when studying the appended claims and the following description. Those skilled in the art realize that different features of the present invention can be combined to create embodiments other than those described in the following.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art.

Figure 1:
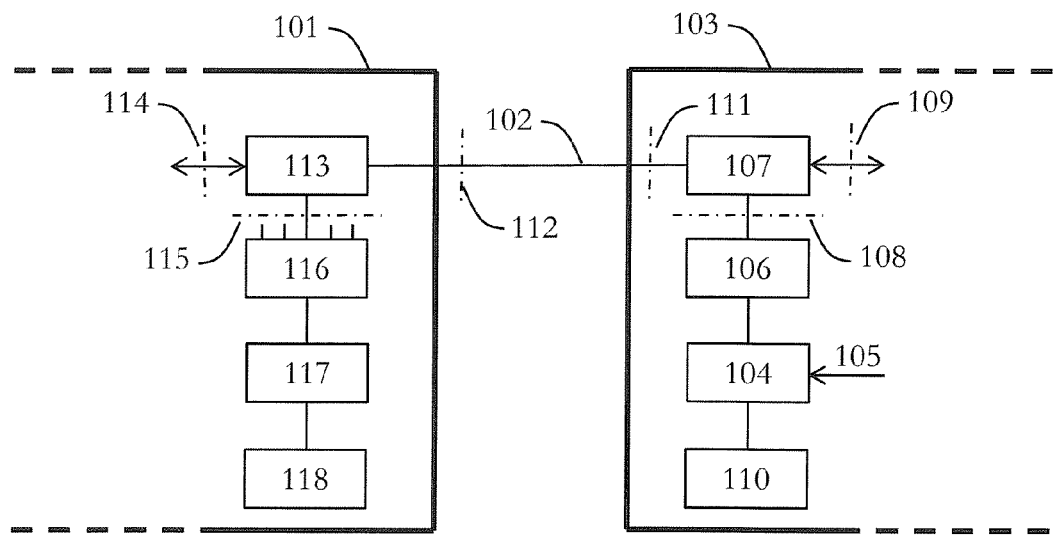
FIG. 1 illustrates network equipment, in which the present invention may be applied.

FIG. 1 illustrates network equipment in which the present invention may be applied. A network node 101, for instance a PON-fed IPSLAM which is fibre-fed from a central office (not shown), is connected via one or more copper pair cables 102 to a network terminal 103 at the customer premises, the same copper pair cable is used to transmit the xDSL data signal from the network node to the home and vice versa. In FIG. 1, only components necessary for describing the present invention are shown. It should be noted that both the network node and the network terminal comprise a plurality of other components such as for example ONU, service splitters, service routers/switches, service gateways, etc. which are not shown in the Figure.

The network terminal comprises a power supply unit (PSU) 104 to which home mains, i.e. 110V-230V, are connected 105. The AC voltage of the home mains have been converted into DC voltage before being connected to the PSU. Alternatively, the PSU comprises AC/DC converters. The PSU supplies the various components of the network terminal with power and is also supplied to a power insertion device 106 for interfacing the PSU to a power splitter 107 via which power from the network terminal is supplied to the network node 101. The interface 108 between the power insertion device and the power splitter is in the art known as $U_{R2P}$. Power splitters are used to separate data signals from the power supplied, both of which travels via the copper cable 102. The data signal is transferred to further network terminal circuitry, and eventually to the user in the form of for instance voice or video data, via interface 109 known in the art as $U_{R2S}$. Optionally a battery 110 is used for back-up purposes at the network terminal. The power provided by the network terminal is transported over the copper cable to the network node via interfaces 111 and 112 known as $U_R$ and $U_O$, respectively.

At the network node, a power splitter 113 is again used for separating data signals from the power supplied. The data signals are carried over interface 114 known as $U_{O2S}$. The power transported across the cable via the power splitter 113 is routed via interface 115 referred to as $U_{O2P}$. The power is fed to a power combiner 116 which combines power from the copper pair cable connected to the respective network terminal connected to the common network node. The combined power is supplied to a PSU 117 which supplies the components of the network node with power. Optionally, the network node comprises a battery 118 used as a back-up to enable e.g. the ONU which terminates the fibre cable at the network node to be able to communicate with the central office even when there are no network terminals actively connected to the network node.

Figure 2:
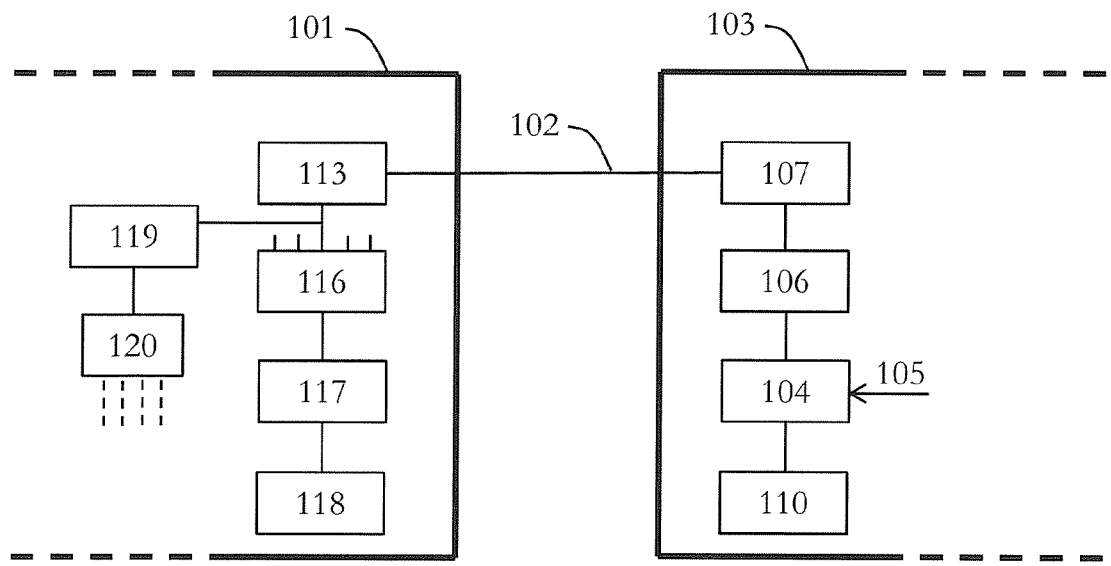
FIG. 2 illustrates a network node arranged with an apparatus according to an embodiment of the present invention.
Figure 3:
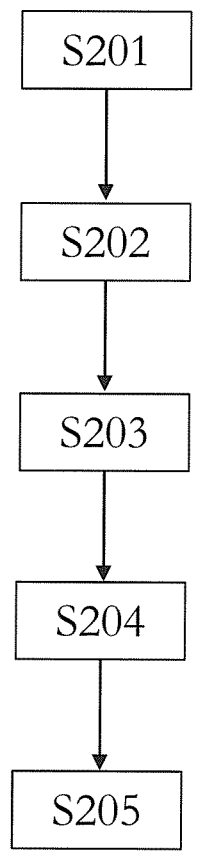
FIG. 3 shows a flowchart illustrating an embodiment of a method according to the present invention.

FIG. 2 illustrates a network node 101 arranged with a power meter 119 according to an embodiment of the present invention for measuring power provided by each network terminal 103 connected to the network node. The power meter is connected to a microprocessor 120 already available at the network node, or may alternatively be equipped with its own microprocessor 120. The microprocessor 120 measures the network node power consumption caused by each individual network terminal such that net power contribution of each individual network terminal can be determined. Each component of the network node will effectively contribute to power consumption, and the processor is (possibly via a power brick) connected to the respective component for power measuring purposes. Each component in the network node requires a power supply and the processor can thus read power consumption of each component and knows the various connections of the component to determine the power consumption caused by each network terminal. The connections of the microprocessor 120 to the network node components for power measuring and possibly control purposes are illustrated by means of the dotted lines. The function of the network node power meter 119 and microprocessor 120 will be described with reference to FIG. 2 and further to FIG. 3 showing a flowchart illustrating a corresponding embodiment of a method according to the present invention. In the following exemplifying embodiment, it is assumed that four network terminals NT1. NT2, NT3, NT4 are connected to, and being serviced by, the network node which has a no-load power consumption of about 100 W. First, the power meter 119 measures in step S201 the power received $P_{NTi}$, from each network terminal at the power combiner 116. In this example, the measurement of the power meter results in $P_{NT1}$=45 W, $P_{NT2}$=37 W, $P_{NT3}$=48 W and $P_{NT4}$=11 W. Thereafter, the copper cable power loss $P_{loss(i)}$ of the respective network terminal is determined by the microprocessor 120 in step S202 to be 1 W for each of the four network terminals. It is now possible for the microprocessor 120 in step S203 to determine the power provided $PP_i$ by each individual network terminal i by adding the power loss to the power received, which results in $PP_1$=46 W, $PP_2$=38 W, $PP_3$=49 W and $PP_4$=12 W.

Further, a previously mentioned the microprocessor 120 measures the power consumption $CP_i$ of the network node caused by each individual network terminal i in step S204. In this exemplifying embodiment, $CP_1$=12 W, $CP_2$=8 W, $CP_3$=10 W and $CP_4$=13 W. Finally, net power provided by each individual network terminal is determined by the microprocessor by calculating $(PP_i-CP_i)$ in step S205, which results in 34 W, 30 W, 39 W and −1 W, respectively. Moreover, to achieve net energy consumption, the time interval during which each network terminal has been serviced by the network node must be taken into account. Assuming that NT1 has been serviced (and provided power to the network node) for 10 hours, NT2 for 16 hours, NT3 for 12 hours and NT4 for 15 hours, the net energy consumption would be 0.34 kWh, 0.48 kWh, 0.468 kWh and −0.015 kWh, respectively. Effectively, this means that the operator of the network node will have to procure a corresponding payment to users 1, 2 and 3, while user 4 consumes more power than he contributes with and thus have to pay for his consumption. Typically, energy consumption is aggregated over time and the energy bill is settled on a monthly basis.

It should be noted that the processor 120 is arranged to execute program code downloaded to a memory associated with the processor. The processor is arranged to carry out at least parts of the steps of the method according to the present invention when appropriate program code is downloaded to its memory and executed by the processor. Thus, the program code comprises computer-executable components for causing the network node to perform at least parts of the steps of the method according to the present invention when the computer-executable components are run on the processor included in the network node. The processor may alternatively be embodied in the form of an application specific integrated circuit (ASIC), a field-programmable gate array (FPGA), or a routine executed on the network node main processor, etc.

With further reference to FIG. 2, in a further embodiment of the present invention, the battery 118 is configured such that it can be provided with power from the network terminal 103. Hence, power (and data) is supplied to the common network node 101 via the copper pair cable 102, and the power splitter 113 separates the data signals from the power supplied. The power transported across the cable via the power splitter is routed to the power combiner 116 which combines power from the copper pair cable connected to the respective network terminal connected to the common network node. The combined power is supplied to the PSU 117 which supplies the components of the network node with power. In this particular embodiment, the PSU supplies the battery 118, which is rechargeable, with power. Thus, the battery is used as a back-up for various components of the network node, For instance, the ONU (not shown) is able to communicate with the central office even when there are no network terminals actively connected to the network node which can happen if there is a local power failure at the network terminal locations. The processor 120 can also measure the current capacity of the battery and regulate the power combiner 160 to control charging speed of the battery.

Figure 4:
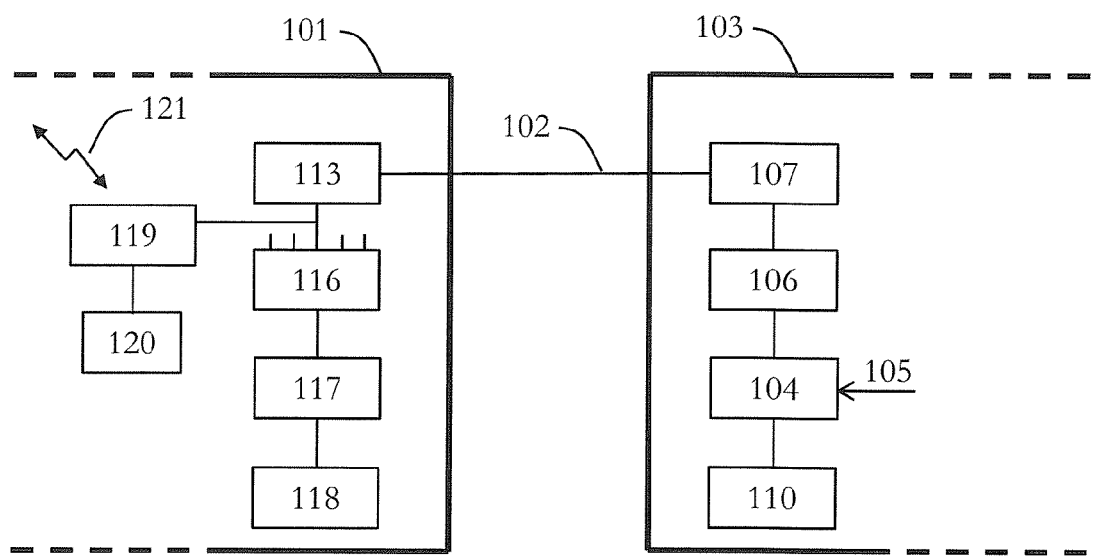
FIG. 4 shows a further embodiment of an apparatus of the present invention.

FIG. 4 shows a further embodiment of the present invention, where the power meter 119 and/or microprocessor 120 is arranged with a communication interface 121 via which the determined net power per time unit of each individual network terminal is communicated (optionally CPi, PPi and battery capacity are communicated as well) to a remote location, typically the central office of the operator of the common network node. Alternatively, the determined net power is communicated to the central office via the ONU and the fibre cable connecting the network node to the central office.

Figure 5:
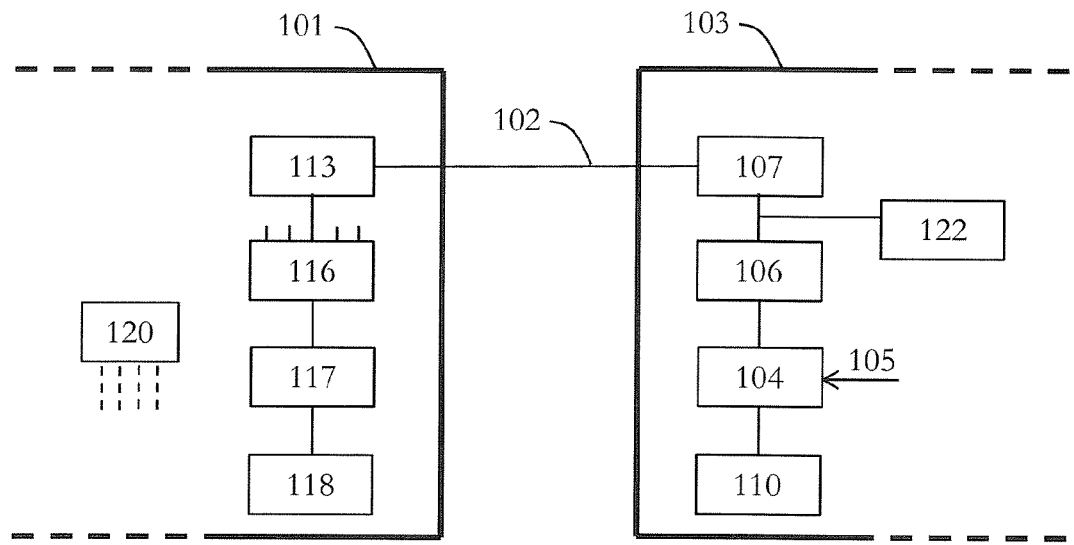
FIG. 5 illustrates an embodiment of a system according to an alternative aspect of the present invention.
Figure 6:
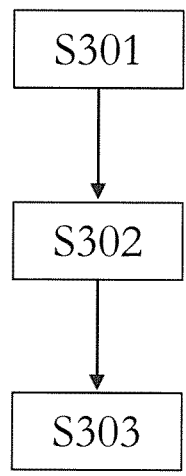
FIG. 6 shows a flowchart illustrating an embodiment of a method according to the alternative aspect of the present invention.
Figure 7:
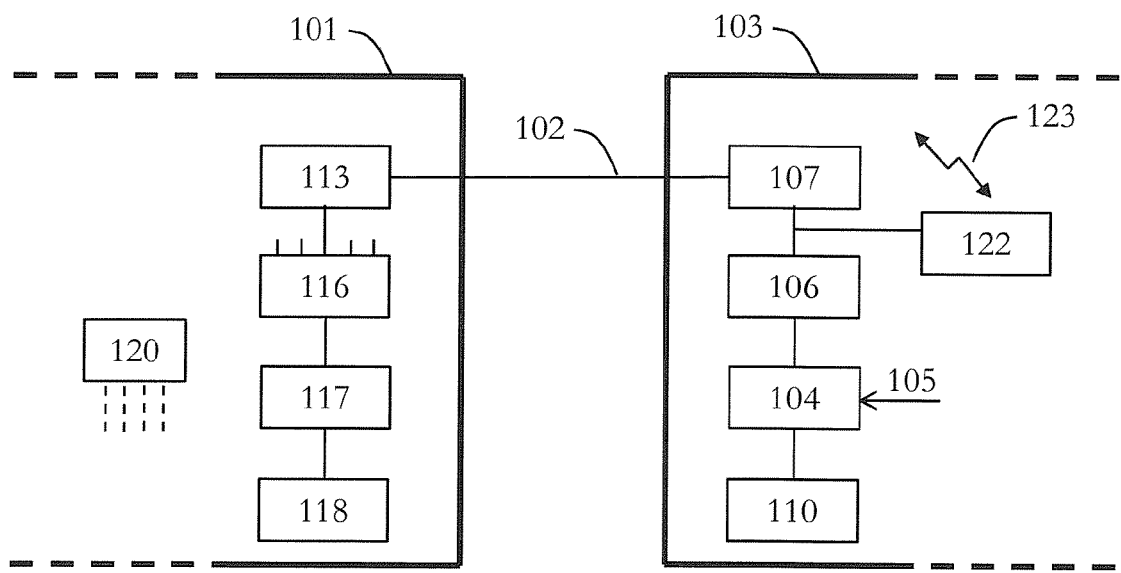
FIG. 7 illustrates a further embodiment of a system of the alternative aspect of the present invention.

FIG. 5 illustrates an embodiment of an alternative aspect of the present invention. In this embodiment, each network terminal 102 is equipped with its own power meter 122 measuring power provided $PP_i$, per time unit. Thus, there is no need for the network node 101 to measure the power received per time unit from each individual network terminal and determine power loss in the copper cable 102. As a consequence, the power meter 119 illustrated in FIGS. 2 and 4 is no longer necessary. The function of the network terminal power meter 122 and microprocessor 120 will be described with reference to FIG. 5 and further to FIG. 6 showing a flowchart illustrating a corresponding embodiment of a method according to the alternative aspect of the present invention. Thus, the network terminal power meter 122 measures power provided $PP_i$ per time unit in step S301. As in the embodiment illustrated in FIGS. 2 and 3, the network node microprocessor 120 measures, in step S302, the power consumption $CP_i$ per time unit of the network node caused by each individual network terminal. Net power per time unit provided by each individual network terminal is determined in step S303 by the microprocessor 120 by calculating $(PP_i-CP_i)$. Thus, each network terminal must communicate the measured $PP_i$ to the common network node such that net contribution of each individual network terminal can be determined. Alternatively, as is illustrated in FIG. 7 by means of wireless interface 123, the measured $PP_i$, is communicated from each network terminal to a centralized facility of an operator of the common network node, to which centralized facility the common network node also communicates the measured $CP_i$ per time unit of each network terminal wherein the operator determines the net contribution of each individual network terminal. Clearly, in case the network terminal communicates the measured $PP_i$ to the common network node, communication can be effected via the cable 102 or the wireless interface 123.

It is also possible that, in an embodiment of the present invention, the power measurement is embodied in the form of a hybrid of the method disclosed in FIGS. 3 and 6; for some network terminals, the power provided to the common network node is measured and determined at the network node while for other terminals, the power provided to the network node is measured at the concerned network terminals.

Figure 8:
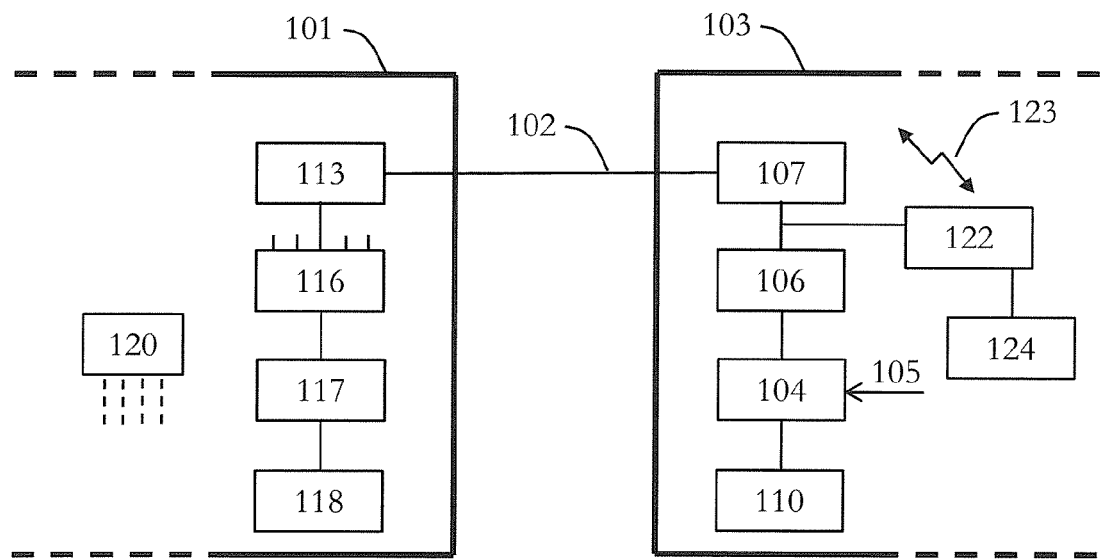
FIG. 8 illustrates yet a further embodiment of a system of the alternative aspect of the present invention.

FIG. 8 illustrates a further embodiment of the alternative aspect of the present invention, where the power provided $(PP_i)$ per time unit by the network terminal 103 to the common network node 101 is presented to a user of the individual network terminal on a display device, e.g. on a screen of the network terminal. This is advantageous since the user herself can check consistency of a bill sent from the operator of the common network node.

Even though the invention has been described with reference to specific exemplifying embodiments thereof, many different alterations, modifications and the like will become apparent for those skilled in the art. The described embodiments are therefore not intended to limit the scope of the invention, as defined by the appended claims.

The invention claimed is:

1. A method of determining power provided by network terminals to a common network node comprising:
   measuring power received per time unit from each individual network terminal;
   determining channel power loss per time unit of each individual network terminal;
   determining power provided per time unit by each individual network terminal by adding, to the power received per time unit from said each individual network terminal, the corresponding channel power loss per time unit;
   measuring power consumption per time unit of the network node caused by each individual network terminal; and
   determining net power per time unit provided by each individual network terminal by taking into account the network node power consumption per time unit caused by said each individual network terminal and the power provided per time unit by said each individual network terminal.

2. The method of claim 1, further comprising:
   accumulating power provided by one or more of the network terminals at the common network node.

3. The method of claim 1, further comprising:
   setting the common network node in a power-down mode when no network terminals are connected.

4. The method of claim 1, further comprising:
   communicating, to a remote location, the determined net power per time unit of each individual network terminal.

5. An apparatus for determining power provided by network terminals to a common network node comprising:
   a power meter; and
   a processing device, wherein:
      said power meter is arranged to measure power received per time unit from each individual network terminal; and
      said processing device is arranged to
         measure power consumption per time unit of the network node caused by each individual network terminal,
         determine channel power loss per time unit of each individual network terminal, power provided per time unit by each individual network terminal by adding, to the power received per time unit from said each individual network terminal, the corresponding channel power loss per time unit, and
         net power per time unit provided by each individual network terminal by taking into account the network node power consumption per time unit caused by said each individual network terminal and the power provided per time unit by said each individual network terminal.

6. The apparatus of claim 5, further comprising:
   an accumulator arranged to accumulate power provided by one or more of the network terminals.

7. The apparatus of claim 5, further comprising:
   a communication interface via which the determined net power per time unit of each individual network terminal is communicated to a remote location.

8. A method of determining power provided by network terminals to a common network node comprising:
   measuring power provided per time unit by each individual network terminal;
   measuring power consumption per time unit of the network node caused by each individual network terminal; and
   determining net power per time unit provided by each individual network terminal by taking into account the network node power consumption per time unit caused by said each individual network terminal and the power provided per time unit by said each individual network terminal.

9. The method of claim 8, further comprising the step of:
   communicating, to a remote location, the measured power provided per time unit by each individual network terminal.

10. The method of claim 9, wherein said remote location is the common network node.

11. The method of claim 9, wherein said remote location is a centralized facility of an operator of the common network node.

12. The method of claim 8, further comprising the step of:
   presenting the power provided per time unit by each individual network terminal to a user of said individual network terminal.

13. A system for determining power provided by network terminals to a common network node, comprising:
   a power meter arranged at each individual network terminal for measuring power provided per time unit by said each individual network terminal; and
   a processor arranged at the common network node for measuring power consumption per time unit of the network node caused by each individual network terminal and for determining net power per time unit provided by each individual network terminal by taking into account the network node power consumption per time unit caused by said each individual network terminal and the power provided per time unit by said each individual network terminal.

14. The system of claim 13, further comprising:
   a communication interface via which the measured power provided per time unit is communicated to a remote location.

15. The system of claim 14, wherein said remote location is the common network node.

16. The system of claim 14, wherein said remote location is a centralized facility of an operator of the common network node.

17. The system of claim 12, further comprising:
   a display device at said individual network terminal for presenting the power provided per time unit by said each individual network terminal to a user.

18. A method of measuring power provided by a network terminal connected to a network node comprising:
   measuring power provided per time unit by the network terminal;
   communicating the measured power provided per time unit, wherein the measured power per time unit is made available at the network node, wherein the network node measures power consumption per time unit of the network node caused by the network terminal, and wherein the network node determines net power per time unit provided by the network terminal by taking into account the network node power consumption per time unit caused by the network terminal and the measured power provided per time unit by the network terminal.

19. The method of claim 18, wherein the measured power provided per time unit is communicated to a remote location.

20. The method of claim 18, wherein said remote location is the network node.

21. The method of claim 18, wherein said remote location is a centralized facility of an operator of the network node.

22. The method of claim 18, wherein the measured power provided per time unit is communicated to a user of the network terminal.

23. An apparatus at a network terminal for measuring power provided by the network terminal to a network node comprising:
- a power meter arranged to measure power provided per time unit by the network terminal; and
- a communication interface arranged to communicate the measured power provided per time unit, wherein the measured power per time unit is made available at the network node, wherein the network node is to measure power consumption per time unit of the network node caused by the network terminal, and wherein the network node is to determine net power per time unit provided by the network terminal by taking into account the network node power consumption per time unit caused by the network terminal and the measured power provided per time unit by the network terminal.

24. The apparatus of claim 23, wherein the measured power provided per time unit is communicated to a remote location.

25. The apparatus of claim 24, wherein said remote location is the network node.

26. The apparatus of claim 24, wherein said remote location is a centralized facility of an operator of the network node.

27. The apparatus of claim 23, wherein the measured power provided per time unit is communicated to a user of the network terminal.

28. A non-transitory storage medium having program code stored therein, which when executed by a processor, causes the processor to perform operations for determining power provided by network terminals to a common network node, the operations comprising:
- measuring power received per time unit from each individual network terminal;
- determining channel power loss per time unit of each individual network terminal;
- determining power provided per time unit by each individual network terminal by adding, to the power received per time unit from said each individual network terminal, the corresponding channel power loss per time unit;
- measuring power consumption per time unit of the network node caused by each individual network terminal; and
- determining net power per time unit provided by each individual network terminal by taking into account the network node power consumption per time unit caused by said each individual network terminal and the power provided per time unit by said each individual network terminal.

* * * * *